United States Patent
West (10) Patent No.: US 8,246,180 B2
(45) Date of Patent: Aug. 21, 2012

(54) CONTENT REFLECTION DISPLAY SYSTEMS

(75) Inventor: Leanne Little West, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 604 days.

(21) Appl. No.: 12/368,440

(22) Filed: Feb. 10, 2009

(65) Prior Publication Data

US 2010/0201954 A1  Aug. 12, 2010

(51) Int. Cl.
G03B 21/00 (2006.01)
G03B 21/26 (2006.01)
H04N 5/445 (2011.01)
H04N 7/00 (2011.01)
H04N 11/00 (2006.01)
H04N 7/08 (2006.01)
G09G 5/00 (2006.01)
G02B 27/14 (2006.01)

(52) U.S. Cl. ............ 353/121; 353/28; 353/30; 353/122; 348/563; 348/468; 345/9; 359/630; 725/137

(58) Field of Classification Search .............. 353/30, 353/121, 122, 28; 348/563, 468; 345/9; 359/838, 630; 463/34; 725/137
See application file for complete search history.

(56) References Cited

U.S. PATENT DOCUMENTS

| 5,570,944 A | 11/1996 | Seder et al. |
| 5,793,470 A * | 8/1998 | Haseltine et al. ............... 353/20 |
| 6,558,000 B2 | 5/2003 | Muehlhoff et al. |
| 7,220,035 B2 * | 5/2007 | Buelow et al. ................. 362/560 |
| 2002/0180936 A1 * | 12/2002 | Muehlhoff et al. ............. 353/31 |
| 2011/0164175 A1 * | 7/2011 | Chung et al. .................. 348/468 |

* cited by examiner

Primary Examiner — Georgia Y Epps
Assistant Examiner — Magda Cruz
(74) Attorney, Agent, or Firm — Ryan A. Schneider, Esq.; Troutman Sanders LLP (57) ABSTRACT

The present invention describes content reflection systems for displaying a select portion of content to a viewer. An exemplary embodiment of the present invention provides a reflecting apparatus comprising a base and a reflective member in communication with the base. The reflective member includes a reflective layer enabled to receive at least a first frequency band of light and a second frequency band of light. Additionally, the reflective layer is enabled to reflect the first frequency band of light and transmit the second frequency band of light. Furthermore, the first frequency band of light includes a first content regarding an audiovisual presentation.

4 Claims, 6 Drawing Sheets

CONTENT REFLECTION DISPLAY SYSTEMS

STATEMENT REGARDING FEDERALLY SPONSORED RESEARCH OR DEVELOPMENT

This invention was made with United States Government support under Contract No. H133E060061, awarded by the U.S. Department of Education. The Government has certain rights in this invention.

FIELD OF THE INVENTION

The present invention relates generally to content reflection display systems and, more particularly, to systems and methods for providing content reflection systems for displaying a select portion of content.

BACKGROUND

Content reflection display systems provide an alternative to open captioning in movie theaters for hearing-impaired patrons. Open captioning, which entails providing captioning in the field of view of all those in the theater, is distracting to those who are not hearing-impaired. Accordingly, content reflection systems were developed to display captioning to select viewers.

In conventional content reflection systems, a light-emitting diode ("LED") display is provided behind the theater patrons. Each hearing-impaired patron is provided with a reflective panel. The panel can be adjusted so that it is in the field of view of the patron, does not significantly obstruct the movie screen, and reflects captioning displayed by the LED display to the eye of the patron.

With conventional content reflection systems, the reflective panel reflects all of the content displayed by the LED to the viewer. Conventional systems do not provide for displaying only select content to a patron using the system.

Therefore, it would be advantageous to provide a content reflection system for selectively reflecting a portion of the displayed content to the viewer.

BRIEF SUMMARY

The present invention describes content reflection systems for displaying a select portion of content to a viewer. An exemplary embodiment of the present invention provides a reflecting apparatus comprising a base and a reflective member in communication with the base. The reflective member includes a reflective layer enabled to receive at least a first frequency band of light and a second frequency band of light. Additionally, the reflective layer is enabled to reflect the first frequency band of light and transmit the second frequency band of light. Furthermore, the first frequency band of light includes a first content regarding an audiovisual presentation.

These and other objects, features and advantages of the present invention will become more apparent upon reading the following specification in conjunction with the accompanying drawing figures.

DETAILED DESCRIPTION

To facilitate an understanding of the principles and features of the invention, various illustrative embodiments are explained below. In particular, the invention is described in the context of being a content reflection system for captioning in movie theaters. Embodiments of the invention, however, are not limited to use for captioning in movie theaters. Rather, embodiments of the invention can be used to deliver many forms of visual content in many venues.

The components described hereinafter as making up various elements of the invention are intended to be illustrative and not restrictive. Many suitable components that would perform the same or similar functions as the components described herein are intended to be embraced within the scope of the invention. Such other components not described herein can include, but are not limited to, for example, components that are developed after development of the invention.

Various embodiments of the present invention comprise content reflection systems and methods for providing same. Referring now to the figures, wherein like reference numerals represent like parts throughout the views, the content reflection system will be described in detail.

Figure 1:
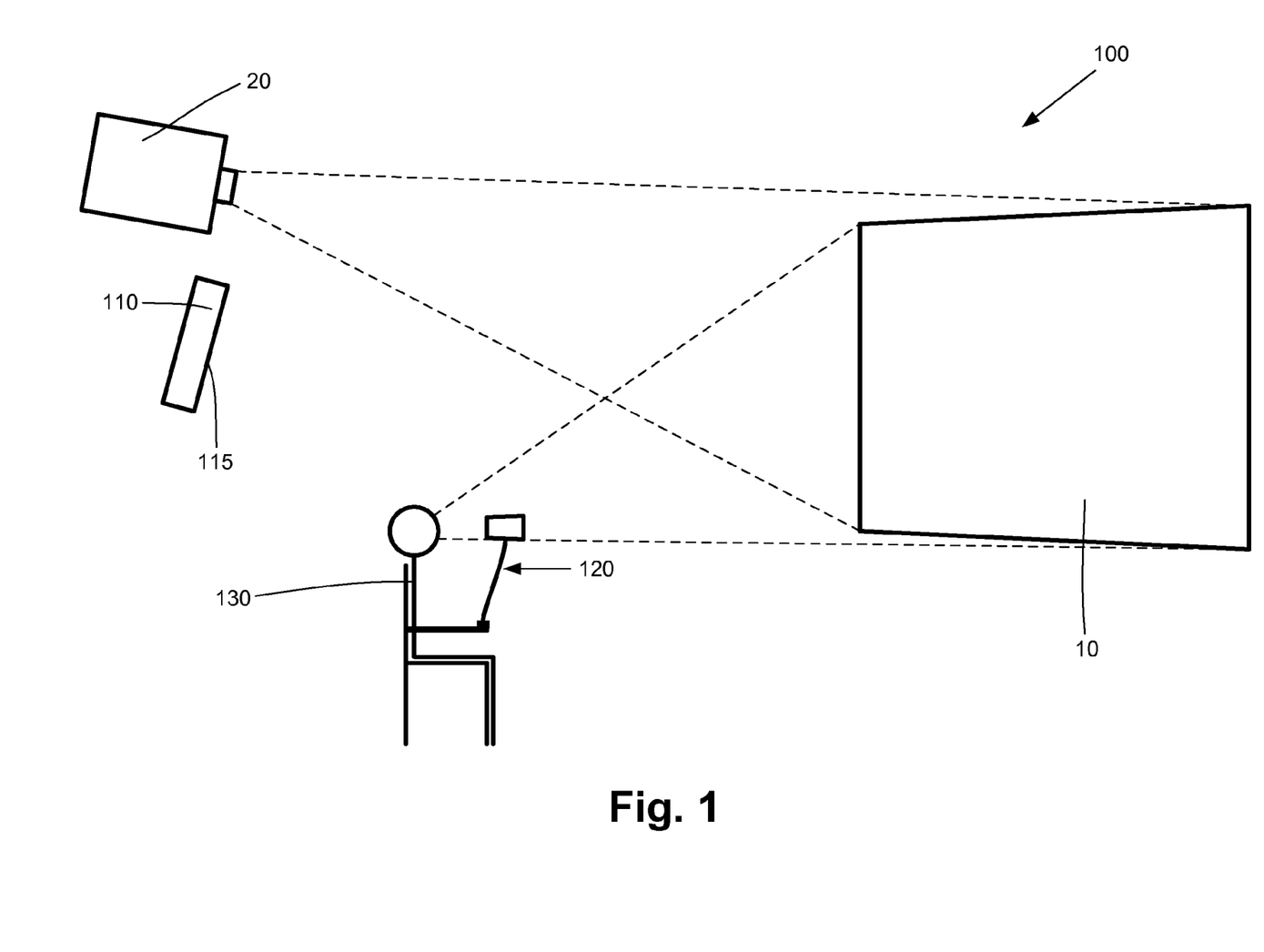
FIG. 1 illustrates a content reflection system in accordance with an exemplary embodiment of the present invention.

FIG. 1 illustrates a content reflection system 100 in accordance with an exemplary embodiment of the present invention. As shown in FIG. 1, an exemplary content reflection system 100 can be implemented in a movie theater, which includes a movie screen 10 and a projector 20. The projector 20 can project a movie onto the screen 10. The content reflection system 100 can comprise a light-emitting system 110 and a reflecting apparatus 120.

During operation of the content reflection system 100, an exemplary light-emitting system 110 can emit light in two or more predetermined frequency bands, including a first frequency band and a second frequency band. In one exemplary embodiment, at least a portion of the first frequency band does not overlap at least a portion of the second frequency band. For example and not limitation, the light-emitting system 110 can emit red light and green light, or any combination of two or more visible colors. Further, each frequency band in which the light-emitting system 110 operates can have a unique band portion, which does not overlap any other frequency band emitted by the light-emitting system 110 during its operation in an exemplary content reflection system 100.

The light-emitting system 110 can have many implementations. For example and not limitation, the light-emitting system 110 can comprise an LED device, computer monitor, plasma television, liquid crystal display ("LCD"), cathode ray tube ("CRT"), projector, or many other devices that can transmit or reflect light to the reflecting apparatus 120. Further, an exemplary light emitting system 110 can comprise one or multiple light-emitting devices. For example, a first LED display of the light-emitting system 110 can emit green light, while a second LED display of the light-emitting system 110 can emit red light. Additionally or alternatively, a single light-emitting device, such as an LED display, can emit light in multiple frequency bands. The light-emitting system 110 can comprise at least one display 115 for presenting content to a viewer 130.

The reflecting apparatus 120 reflects content displayed by the light emitting system 110. The reflecting apparatus 120 can be adjustable, such that the viewer 130 can adjust the reflecting apparatus 120 to reflect light from the light emitting system 120 to the viewer 130. The reflecting apparatus 120 can be positionable such that the viewer 130 can easily view the reflection apparatus 120 and the movie screen 10 or other presentation. In one embodiment, the reflecting apparatus 120 can be positionable in or near the field of view of the viewer 130, as the viewer observes the screen 10 or other presentation. The reflection apparatus 120 can be attached to the viewer 130, positioned near the viewer 130, or attached to a portion of the viewer's seat.

The content reflection system 100 can be used during many forms of presentation. Alternatively to incorporation into a movie theater, the content reflection system 100 can be incorporated into a live theater and can be used, for example, during a play, opera, or other live performance. If the content reflection system 100 is used during a live performance, the light-emitting system 120 can be positioned so as to minimize distraction to performers. For example, an area in a back corner of the audience section can be designated for use of the content reflection system 100, such that the light-emitting system 110 occupies a relatively inconspicuous space from a point of view of performers.

Figure 2:
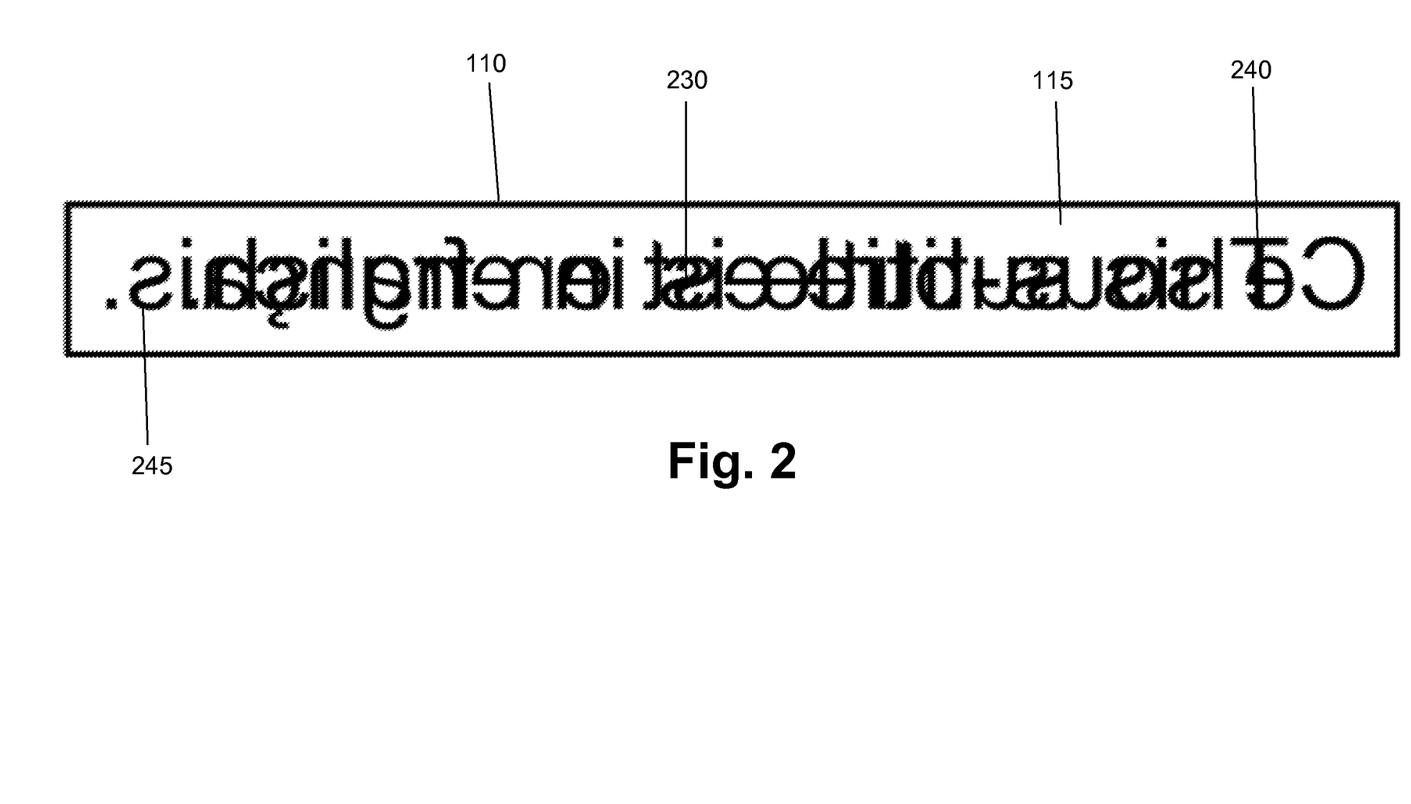
FIG. 2 illustrates a front view of a light-emitting system of a content reflection system in accordance with an exemplary embodiment of the present invention.

FIG. 2 illustrates a front view of an exemplary display 115 of the light-emitting system 110 of the content reflection system 100. The light-emitting system 110 can display content 230 two or more frequency bands. A first content 240 can be displayed in the first frequency band, and a second content 245 can be displayed in the second frequency band.

Exemplarily, the content 230 of each frequency band can be unique and independent of other contents 230. As shown, the first and second contents 240 and 245 can differ. Exemplary first and second contents 240 and 245 can be independent each other, such that each of the first and second contents 240 and 245 is meant to be viewed independent of the other content 240 or 245. For example and not limitation, the first content 140 can comprise subtitles in a first language, while the second content 145 comprises subtitles in a second language. The content reflection system 100 enables viewers 130 to view the first content 240 without seeing the second content 245, or vice versa.

The first content 240 and the second content 245 can comprise many varieties of visual content. For example and not limitation, the contents 240 and 245 can comprise subtitles or captioning. Subtitles generally consist of text corresponding to spoken words in an audiovisual presentation. In addition to such text corresponding to spoken words, captioning also includes text describing other sounds that are part of the presentation. For example, captioning might indicate that music is playing, a dog is barking in the background.

In addition to displaying subtitles or captioning to the viewer 130, the content reflection system 100 can display many other varieties of visual content, which can be designed to augment a presentation. The first content 240 and the second content 245 can be used to display different sets of information to different viewing groups. For example and not limitation, during a business presentation, the first content 240 can comprise sales data for display to sales personnel, and the second content 245 can comprise marketing data for display to marketing personnel. For further example, the content reflection system 100 can display advertisements to viewers, or can act as a display device for a computing system.

The content 230 can be synchronized with the presentation or audiovisual display, such that at a point in time, the content 230 displayed corresponds to a current point in the presentation. Accordingly, the content 230 can augment audiovisual presentations, such as movies, concerts, or other performances.

As shown in FIG. 2, an exemplary light-emitting system 110 can display a mirror image of the content 230 to be viewed by the viewer 130. In other words, the light-emitting system 110 can display content 230 horizontally flipped. Accordingly, when such content 230 is reflected to the viewer 130 via the reflecting apparatus 120, the content is properly displayed.

Alternatively, the light-emitting system can display the actual content 230, and not a mirror image thereof. In that case, the content 230 can be reflected an even number of times before it reaches the viewer's eye, such that the content 230 is properly displayed to the viewer 130. The reflecting apparatus 120 can provide the final of these reflections. For example, the content can be reflected by a mirror, and such mirror can be reflected to the viewer 130 via the reflecting apparatus 120.

A content 230 may contain more text, images, or other data than can be displayed by the light-emitting system 110 at any one time in a size adequate for the viewer 130 to see through the reflecting apparatus 120. As such, the light-emitting system 110 can swap displayed data with other data, so as to eventually display the entire content 230. This swapping can be implemented in many suitable fashions. For example and not limitation, the light-emitting system 110 can scroll the content 230 across the display 115, or can flash portions of the content 230, such that each portion replaces a previous portion of the content 230. The light-emitting system 110 can, but need not, implement the same manner of swapping data for each content 230, such as the first content 240 and the second content 245.

Content 230 can be displayed by the light-emitting system 110 the in many configurations. As shown, the first content 240 and the second content 245 can overlap each other. While such a configuration may be difficult to read with the naked eye, an exemplary embodiment of the present content reflection system enables selective viewing of a single content 230 in a single frequency band. Further, overlapping content can utilize space more efficiently than content 230 that does not overlap. However, the first content 240 and the second content 245 need not overlap, but can be displayed in many orientations and positions with respect to each other.

Figure 3A:
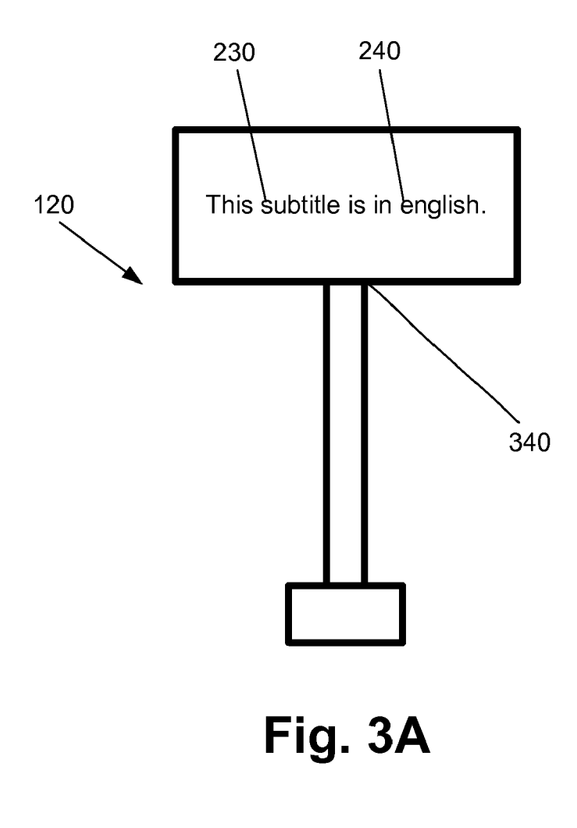
FIG. 3A-3B illustrate front views of reflecting apparatuses of a content reflection system in accordance with an exemplary embodiment of the present invention.
Figure 3B:
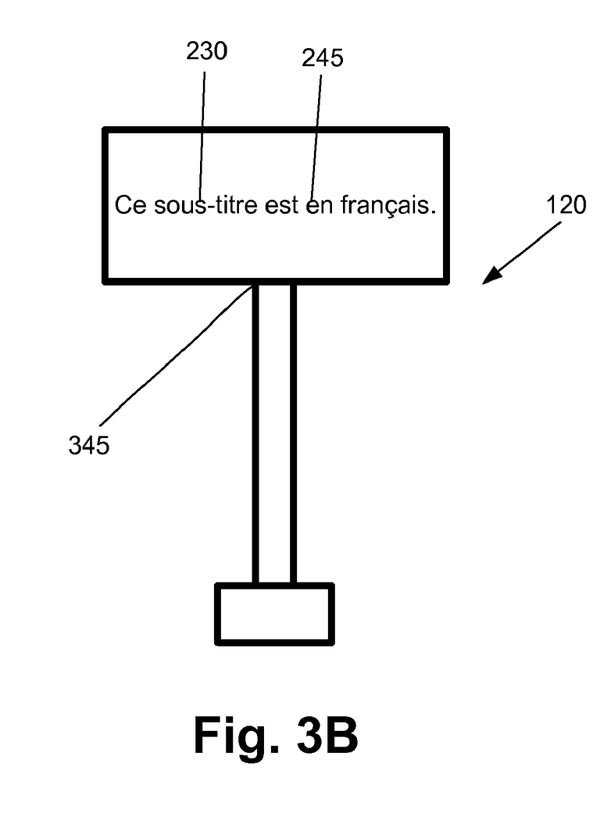

FIGS. 3A-3B illustrate two exemplary reflecting apparatuses 120 reflecting content displayed by the exemplary light-emitting source 110 of FIG. 2. In one exemplary embodiment, two or more types of reflecting apparatuses 120 can be provided in the content reflection system 100. Each reflecting apparatus 120 can be adapted to reflect light in one of the select frequency bands in which the light-emitting system 110 operates in the content reflection system 100.

An exemplary reflecting apparatus 120 can reflect light in one of the predetermined frequency bands. In one embodiment, the reflecting apparatus 120 can reflect light in a portion of the frequency band, such that the portion is unique among all the select frequency bands. For example and not limitation, as long as at least a portion of light in the chosen frequency band is reflected, the reflecting apparatus 120 can selectively reflect light in any of the following categories, or any combination thereof: any or substantially all light outside of the other select frequency bands; any or substantially all light below a predetermined wavelength threshold; or any or substantially all light above a predetermined threshold. In other words, in many manners, the reflecting apparatus 120 can reflect light in the chosen frequency band while selectively not reflecting light in other predetermined frequency bands. Accordingly, each reflecting apparatus 120 can reflect light associated with only a single content 230 displayed by the light-emitting source during operation of an exemplary content reflection system 100.

The first reflecting apparatus 340, shown in FIG. 3A, can reflect the first content 240 in the first frequency band and generally can reflect little to no light in the second frequency band. Light in the second frequency band reflected by the first reflecting apparatus 340 can be so minimal as to be unnoticeable or to cause little distraction to the viewer 130 from viewing the first content 240. Because light in the second frequency band is generally not visible to the viewer 130 of the first reflecting apparatus 340, the viewer does not see a reflection of the second content 245. Accordingly, as shown, the viewer 130 sees the first content 240 without the distraction of other contents 230 in other frequency bands.

Contrastingly, the second apparatus 345, shown in FIG. 3B, can reflect the second content 245 in the second frequency band. Light in the first frequency band reflected by the second reflecting apparatus 345 can be so minimal as to be unnoticeable or to cause little distraction to the viewer 130 from viewing the second content 245. Accordingly, as shown, the viewer 130 sees the second content 245 without the distraction of other contents 230 in other frequency bands.

As shown in FIG. 3A, the first content 140, which can be displayed in mirror image by the light-emitting system 110, appears properly (i.e., readable from left to right) after being reflected by the first reflecting apparatus 340. Likewise, as shown in FIG. 3B, the second content 145, which can also be displayed in mirror image by the light-emitting system 110, appears properly (i.e., readable from left to right) after being reflected by the second reflecting apparatus 345. Alternatively, as described above, an exemplary reflecting apparatus 120 can display the actual content 230, as opposed to a mirror image of such content 230, when the content 230 is reflected an even number of times before reaching the viewer's eye.

Figure 4:
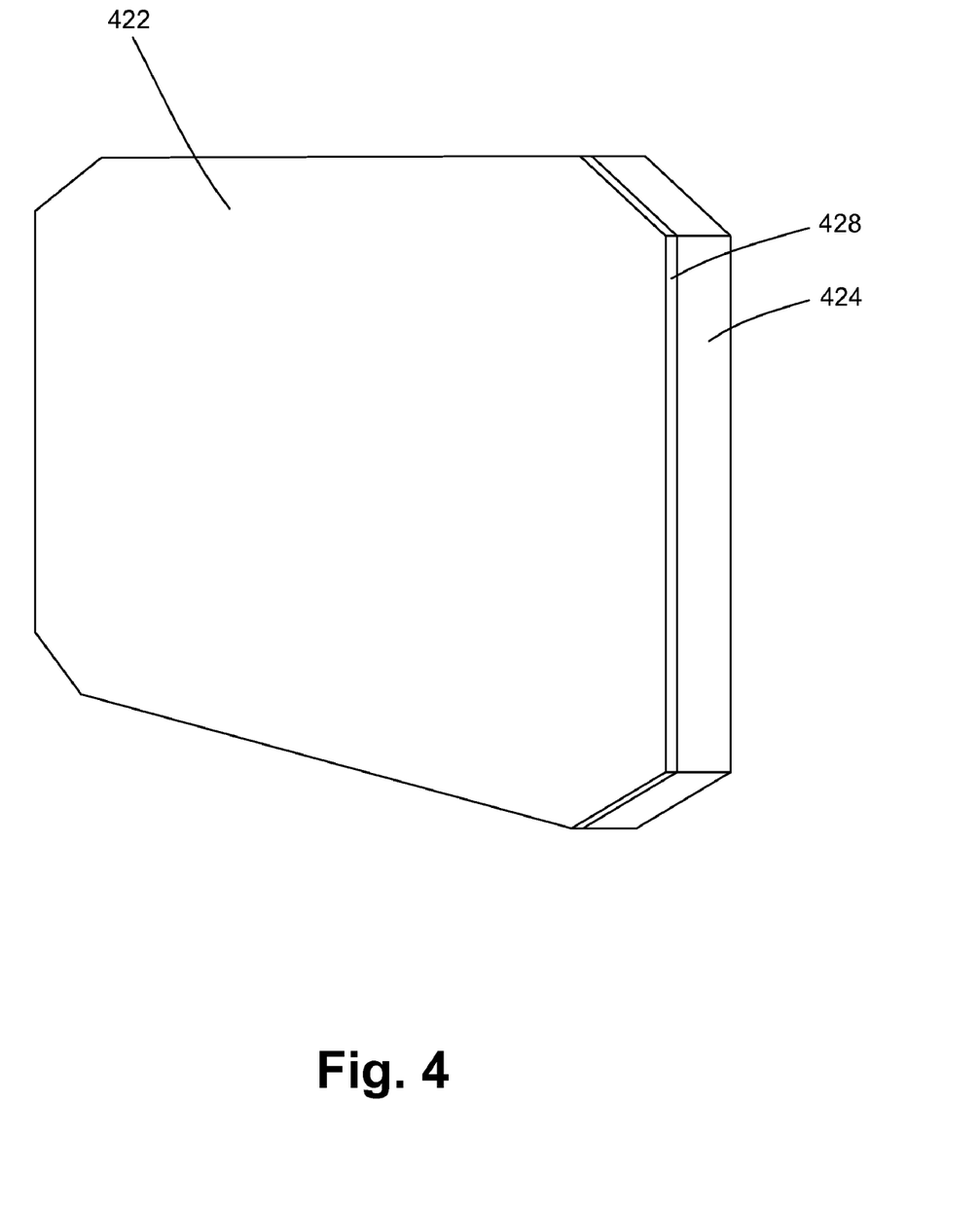
FIG. 4 illustrates a perspective view of a reflective member of a reflecting apparatus in accordance with an exemplary embodiment of the present invention.

FIG. 4 illustrates a perspective view of a reflective member 422, or reflective panel, of an exemplary reflecting apparatus 120. The reflective member 422 can reflect light displayed by the light-emitting system 110 to the viewer 100, and can be configured to reflect light within a predetermined frequency band. The reflective member 422 can be many shapes, including octagonal, rectangular, or elliptical, and the shape of the reflective member 422 is preferably adapted for easily displaying content to a viewer.

In an exemplary embodiment, the reflective member 422 can include a reflective layer 428 and a substrate layer 424. In an exemplary embodiment, the substrate layer 424 can be provided in communication with the reflective layer 428 and, in some embodiments, the reflective layer 428 can be applied to or secured to the substrate layer 424. Those of skill in the art will appreciate that the substrate layer 424 can be comprised of many suitable materials, including glass, plastic, polymers, or other materials providing the desired transmittance characteristics for a particular implementation of the reflecting apparatus 120.

The reflective layer 428 can comprise a variety of suitable materials capable of selectively reflecting light based on wavelength. In an exemplary embodiment the reflective layer 428 can be a wavelength selective mirror. The wavelength selective mirror exemplary embodiment of the reflective layer 428 can be enabled to reflect a first frequency band of light and transmit a second frequency band of light. In other words, the wavelength selective mirror exemplary embodiment of the reflective layer 428 can be enabled to reflect a certain color of light in a first frequency band (i.e., red) and allow all a second color of light in a second frequency band (i.e., green) to pass through or transmit through the reflective layer 428. In another embodiment, the wavelength selective mirror exemplary embodiment of the reflective layer 428 can be enabled to reflect a certain color of light in a first frequency band (i.e., red) and allow all remaining light to pass through or transmit through the reflective layer 428.

In an exemplary embodiment the reflective layer 428 can be a dichroic mirror. In this embodiment, the mirror has special dichroic coatings which provide a high percentage of reflectance for light in a first frequency band and a high percentage of transmittance for light in a second frequency band. In a non-limiting example, a dichroic mirror reflective layer 428 provides alternating layers of an optical coating to be built up upon glass substrate layer 424, selectively reinforcing certain wavelengths of light and interfering with other wavelengths. By controlling the thickness and number of the dichroic coating layers of the reflective layer 428, the frequency (wavelength) of the reflectance of the reflective layer 428 can be tuned and made as wide or narrow as desired.

Those of skill in the art will appreciate that the reflective layer 428 can implemented with a variety of different suitable devices and techniques. In addition to a dichroic mirror, other dielectric coatings or optical thin-film coatings can be configured to create the reflective layer 428. Furthermore, alternative embodiments of the reflecting apparatus 120 could includes a configuration of filtering members enabled to filter out a desired frequency band of light and reflect that first frequency band of light while transmitting a second frequency band of light.

In an exemplary embodiment, a first reflecting apparatus 120 is configured to selectively reflect a desired first content 240, such as subtitles in English, provided in light displayed in a first frequency band, such as red light. Likewise, a second reflecting apparatus 120 is configured to selectively reflect a desired second content 245, such as subtitles in Spanish, provided in light displayed in a second frequency band, such as green light.

In an alternative exemplary embodiment of the reflecting apparatus 120, the reflective layer 428 can be removable and swappable, such that a user can swap a first reflective layer 428 with a second reflective layer 428. Each reflective layer 428 can selectively reflect a different set of light frequencies to the viewer 130. A viewer 130 can select which content 230 is viewed by securing the desired applicable reflective layer 428 to the reflective member 422.

Preferably, each reflective member 422 can reflect light in a frequency band that overlaps no more than one of the select frequency bands in which the light-emitting system 110 operates in the content reflection system 100. In other words, if a reflective member 422 reflects light in the first frequency band, it may not also reflect a noticeable portion of light in the second frequency band, or any other select. Accordingly, the viewer 130 can view one set of content 230 in the reflective member 422 without also seeing a portion of another set of content 230 in the same reflective member 422.

Figure 5:
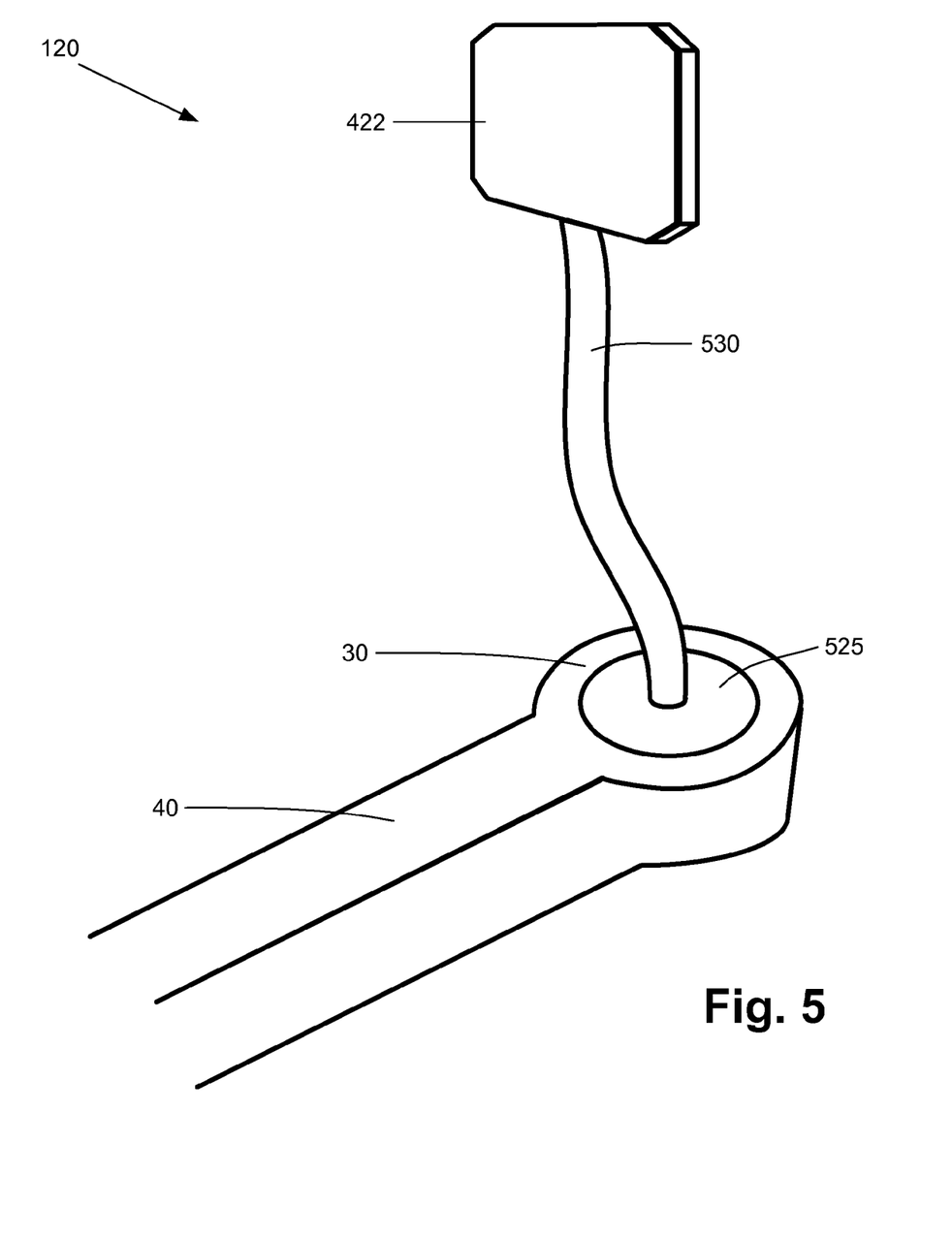
FIG. 5 illustrates a partial cross-sectional perspective view of a reflecting apparatus of a content reflection system in accordance with an exemplary embodiment of the present invention.

FIG. 5 illustrates a partial cross-sectional perspective view of a reflecting apparatus. As shown, in addition to the reflective member 422, the reflecting apparatus 120 can comprise a base 525 and an adjustment assembly 530.

The base 525 can serve as a support or stabilizer for the reflecting apparatus 120. The base 525 can be many shapes and materials, but it is desirable the shape and materials of the base 525 are such that the base 525 can support the reflecting apparatus 120 when the reflecting apparatus 120 is in an upright position. The base 525 can be connectable to the viewer 130 or some object proximate the viewer 130. For example, as shown, the base 525 can be insertable into a cup-holder 30 for convenient placement during a presentation, or can be securable to an arm rest 40 or to a seat in front of the viewer (not shown).

The adjustment assembly 530 can connect the base 525 to the reflective member 422, and can enable adjustment of the position and orientation of the reflective member 422 with respect to the base 525. The adjustment assembly 530 can be adjustable to enable the viewer 130 to position and orient the reflective member 422 such that viewer 130 can easily both see the reflected content 230 in the reflective member 422 and the presentation, such as a movie. The adjustment assembly 530 can enable the reflective member 422 to reflect content 230 to the viewer 230 while positioned at least partially in the field of view of the viewer 130 as the viewer 130 watches the presentation. It is desirable that the adjustment assembly provides infinite or continuous adjustment, but adjustment to predetermined positions can also be implemented. As shown, the adjustment assembly 530 can comprise a gooseneck 535.

Figure 6:
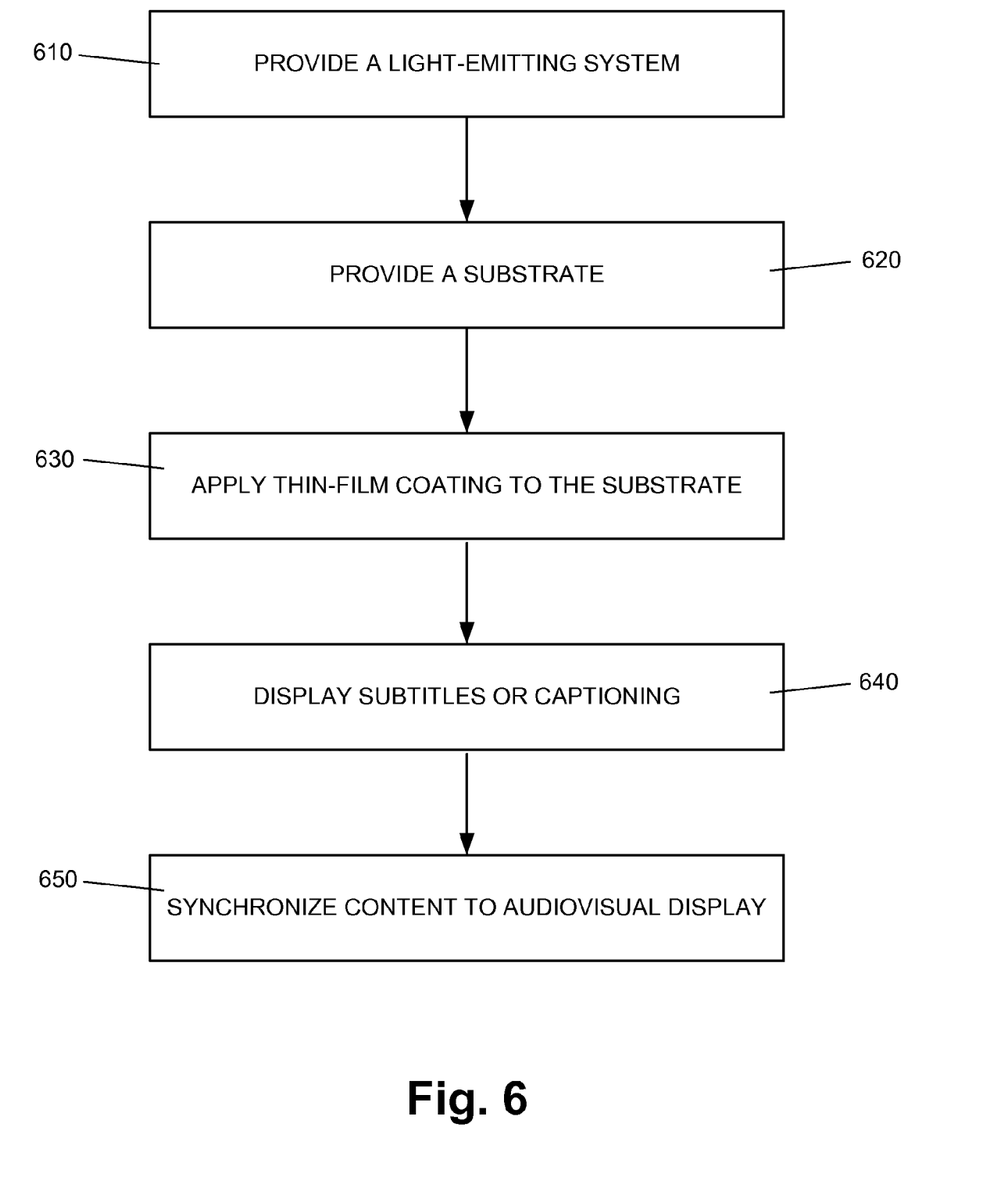
FIG. 6 illustrates a flow diagram of a process of delivering select content to a viewer via a content reflection system in accordance with an exemplary embodiment of the present invention.

FIG. 6 illustrates a flow diagram of a process of delivering select content to a viewer via the present content reflection system. Each box in FIG. 6 represents a sub-process of the overall content delivery process. Those of skill in the art would appreciate that the sub-processes illustrated in FIG. 6 need not be undertaken in the order illustrated, and one or more of the sub-processes can be segments of other sub-processes. Further, not all of the sub-processes illustrated need be undertaken for every embodiment of the manufacturing process, and additional sub-processes can be provided.

At 610, a light-emitting system 110 can be provided for emitting light in at least two frequency bands and, thereby, displaying a first content 240 in a first frequency band and a second content 245 in a second frequency band. At 620, a reflecting apparatus 120, as described above, can be provided for reflecting light of predetermined wavelengths to a viewer 130. Optionally, an optical thin-film coating 428 can be applied to the reflective member 422 of the reflecting apparatus 120, as at 630, such that the optical thin-film coating 428 selectively reflects light based on wavelength. At 640, subtitles or captioning can be displayed in the first content and the second content, and such subtitles or captioning can be in a different language in the second content 245 than in the first content 240. At 650, the first content 240 can be synchronized to an audiovisual display, such as a movie.

Although aspects of the content reflection system 100 are disclosed above, the presently disclosed embodiments are considered in all respects to be illustrative and not restrictive. It will be apparent to those skilled in the art that many modifications, additions, and deletions can be made to the disclosed embodiments without departing from the spirit and scope of the invention and its equivalents, as set forth in the following claims.

What is claimed is:

1. A method for displaying content to a viewer, the method comprising:
   providing a light-emitting system for simultaneously displaying a first content in a first frequency band of light and a second content in a second frequency band of light, the first frequency band of light including a first content regarding an audiovisual presentation and the second frequency band of light including a second content regarding an audiovisual presentation, wherein the first content and the second content are different, and wherein at least a portion of the first frequency band does not overlap at least a portion of the second frequency band of light; and
   providing a reflecting apparatus comprising a reflective member for reflecting light from the light-emitting system, wherein the reflecting apparatus is enabled to selectively reflect the first frequency band and not the second frequency band.

2. The method of claim 1, further comprising applying an optical thin-film coating to the reflective member of the reflecting apparatus, wherein the thin-film coating is adapted to reflect light based on wavelength.

3. The method of claim 1, further comprising synchronizing the first content to an audiovisual display.

4. The method of claim 1, further comprising displaying subtitles or captioning in the first content and in the second content, wherein the first content and second content are in different languages.

* * * * *